United States Patent
Kim et al.

(10) Patent No.: US 9,903,628 B2
(45) Date of Patent: Feb. 27, 2018

(54) METHOD FOR CONTROLLING ELECTRIC COMPRESSOR OF HEAT PUMP SYSTEM FOR AN AUTOMOTIVE VEHICLE

(71) Applicant: Halla Visteon Climate Control Corp., Daejeon (KR)

(72) Inventors: Hak Kyu Kim, Daejeon (KR); Sung Ho Kang, Daejeon (KR); Sang Ki Lee, Daejeon (KR); Young Ho Choi, Daejeon (KR); Jae Min Lee, Daejeon, KS (US); Jung Jae Lee, Daejeon (KR)

(73) Assignee: HALLA VISTEON CLIMATE CONTROL CORP., Daejeon (KR)

(*) Notice: Subject to any disclaimer, the term of this patent is extended or adjusted under 35 U.S.C. 154(b) by 511 days.

(21) Appl. No.: 14/493,736

(22) Filed: Sep. 23, 2014

(65) Prior Publication Data

US 2015/0082814 A1 Mar. 26, 2015

(30) Foreign Application Priority Data

Sep. 23, 2013 (KR) .................. 10-2013-0112370

(51) Int. Cl.
*F25B 49/02* (2006.01)
*B60H 1/32* (2006.01)

(52) U.S. Cl.
CPC ......... *F25B 49/022* (2013.01); *B60H 1/3216* (2013.01); *F25B 49/025* (2013.01); *B60H 2001/325* (2013.01); *B60H 2001/3272* (2013.01); *B60H 2001/3292* (2013.01); *F25B 2500/07* (2013.01); *F25B 2500/12* (2013.01); *F25B 2500/19* (2013.01); *F25B 2600/02* (2013.01); *F25B 2700/1931* (2013.01); *F25B 2700/2104* (2013.01)

(58) Field of Classification Search
CPC .............. F25B 49/02; F25B 49/025; F25B 2700/2104; F25B 2500/07; F25B 2500/12; F25B 2500/19; F25B 2700/1931; F25B 2600/02; B60H 1/3216; B60H 2001/325; B60H 2001/3272; B60H 2001/3292
See application file for complete search history.

(56) References Cited

U.S. PATENT DOCUMENTS

| 5,341,868 A * | 8/1994 | Nakata ............... B60H 1/00007 165/11.1 |
| 5,347,824 A * | 9/1994 | Kato ................... B60H 1/3208 62/133 |
| 5,483,805 A * | 1/1996 | Fujii .................. B60H 1/00878 62/158 |

(Continued)

FOREIGN PATENT DOCUMENTS

| KR | 20080026983 A | 3/2008 |
| KR | 1020100078736 A | 7/2010 |
| KR | 1020120042104 A | 5/2012 |

*Primary Examiner* — Kun Kai Ma
(74) *Attorney, Agent, or Firm* — James D. Miller; Shumaker, Loop & Kendrick, LLP

(57) ABSTRACT

Disclosed herein is a method for controlling an electromotive compressor in a heat pump system for a vehicle. In accordance with an embodiment of the present invention, an unexpected cutoff of a compressor attributable to overload and the generation of noise and vibration attributable to frequent restarts can be prevented by controlling the number of rotations of the compressor within a specific range based on the discharge pressure of the compressor.

17 Claims, 4 Drawing Sheets

(56) References Cited

U.S. PATENT DOCUMENTS

| | | | | |
|---|---|---|---|---|
| 5,771,704 A * | 6/1998 | Nakajima | F25B 49/025 | 62/228.4 |
| 5,782,102 A * | 7/1998 | Iritani | B60H 1/00021 | 62/197 |
| 6,148,632 A * | 11/2000 | Kishita | B60H 1/00914 | 62/196.4 |
| 6,834,511 B2 * | 12/2004 | Hatakeyama | B60H 1/00849 | 62/159 |
| 7,201,010 B2 * | 4/2007 | Homan | B60H 1/004 | 62/228.4 |
| 2003/0046943 A1 * | 3/2003 | Takano | B60H 1/3207 | 62/186 |
| 2003/0213256 A1 * | 11/2003 | Ueda | F25B 1/02 | 62/230 |
| 2004/0172959 A1 * | 9/2004 | Oomura | B60H 1/3205 | 62/228.1 |
| 2004/0237553 A1 * | 12/2004 | Yamasaki | F25B 9/008 | 62/229 |
| 2006/0111220 A1 * | 5/2006 | Ogawa | B60T 7/12 | 477/183 |
| 2006/0236708 A1 * | 10/2006 | Mizuno | B60H 1/3219 | 62/228.3 |
| 2008/0014097 A1 * | 1/2008 | Hase | F04B 41/06 | 417/212 |
| 2008/0240953 A1 * | 10/2008 | Kimura | F04C 23/001 | 418/9 |
| 2009/0240374 A1 * | 9/2009 | Hyun | F25B 49/025 | 700/275 |
| 2009/0263255 A1 * | 10/2009 | Goto | F04B 49/02 | 417/44.1 |
| 2010/0287964 A1 * | 11/2010 | Okamoto | F24D 11/0214 | 62/224 |
| 2012/0266624 A1 * | 10/2012 | Inaba | B60H 1/00899 | 62/324.6 |
| 2012/0272673 A1 * | 11/2012 | Yokohara | F25B 41/04 | 62/180 |
| 2013/0055751 A1 * | 3/2013 | Inaba | B60H 1/2218 | 62/498 |
| 2013/0081417 A1 * | 4/2013 | Tamura | F25B 13/00 | 62/160 |
| 2014/0140813 A1 * | 5/2014 | Ochi | F04D 13/12 | 415/13 |

* cited by examiner

METHOD FOR CONTROLLING ELECTRIC COMPRESSOR OF HEAT PUMP SYSTEM FOR AN AUTOMOTIVE VEHICLE

CROSS-REFERENCE TO RELATED APPLICATION

This application claims priority to Korean Patent Application No. 10-2013-0112370, filed on Sep. 23, 2013, the disclosure of which is incorporated herein by reference in its entirety.

FIELD OF THE INVENTION

Exemplary embodiments of the present invention relate to a method for controlling an electromotive compressor, and more particularly, to a method for controlling an electromotive compressor in a heat pump system for a vehicle, which is capable of preventing the unexpected cutoff of a compressor in a heat pump system for a vehicle by controlling the number of rotations of the compressor based on the discharge pressure of the compressor.

BACKGROUND OF THE INVENTION

In general, a heat pump system means an air-conditioning system configured to perform cooling and heating at the same time using a single refrigerant system. The heat pump system includes a compressor, an indoor heat exchanger, an outdoor heat exchanger, an expansion valve, and a direction control valve.

In the heat pump system, when cooling is performed, a refrigerant is circulated along the paths of the compressor, the outdoor heat exchanger, the expansion valve, the indoor heat exchanger, and the compressor. When heating is performed, a refrigerant is circulated along the paths of the compressor, the indoor heat exchanger, the expansion valve, the outdoor heat exchanger, and the compressor.

That is, when cooling is performed, the indoor heat exchanger operates as an evaporator and the outdoor heat exchanger operates as a condenser. When heating is performed, the indoor heat exchanger operates as a condenser and the outdoor heat exchanger operates as an evaporator.

FIG. 1 is a configuration illustrating a conventional heat pump system for a vehicle, which is disclosed in Korean Patent Application Publication No. 10-2008-0026983. The conventional heat pump system for a vehicle includes a compressor 10 and an indoor heat exchanger 20. The compressor 10 compresses an evaporated refrigerant into gas of a high temperature and high pressure. The indoor heat exchanger 20 performs heat exchange of a compressed refrigerant of a high temperature and high pressure with external air.

The conventional heat pump system for a vehicle includes an expansion valve 30, an outdoor heat exchanger 40, and an internal heat exchanger 50. The expansion valve 30 expands a refrigerant that has been subjected to a heat exchange by the indoor heat exchanger 20 at a low temperature and low pressure. The outdoor heat exchanger 40 receives the expanded refrigerant of a low temperature and low pressure and evaporates the received refrigerant by performing heat exchange of the received refrigerant ambient air. In particular, the outdoor heat exchanger 40 is installed outside a vehicle and is configured to evaporate the refrigerant of a low temperature and low pressure while absorbing surrounding heat.

The internal heat exchanger 50 performs heat exchange of a refrigerant on the outlet side of the indoor heat exchanger 20 with a refrigerant on the outlet side of the outdoor heat exchanger 40 and forcibly lowers a temperature of a refrigerant on the outlet side of the indoor heat exchanger 20.

The internal heat exchanger 50 is equipped with a first passage 52 and a second passage 54 corresponding to each other. A refrigerant of a high temperature that flows from the indoor heat exchanger 20 to the expansion valve 30 may pass through the first passage 52. A refrigerant of a low temperature that flows from the outdoor heat exchanger 40 to the compressor 10 may pass through the second passage 54. The refrigerant of a high temperature that passes through the first passage 52 and the refrigerant of a low temperature that passes through the second passage 54 are subjected to mutual heat exchange.

In this case, the conventional heat pump system includes heating means 60 for heating a refrigerant that flows from the second passage 54 of the internal heat exchanger 50 to the compressor 10. The heating means 60 may be formed of a hot wire or Positive Temperature Coefficient (PTC) heater 62.

Such conventional heat pump system for a vehicle includes control logic for forcibly cutting off an electromotive compressor in order to prevent overload of a system when cooling or heating is performed.

When cooling is performed (i.e., in air-conditioning mode), if discharge pressure, that is, pressure on the high pressure side, exceeds a specific level while the electromotive compressor operates, the electromotive compressor is forcibly cut off for the durability and safety of the heat pump system.

Furthermore, when heating is performed (i.e., in heat pump mode), the electromotive compressor may be cut off due to an overcurrent that is attributable to an increased load even in the same number of rotations per minute (rpm) of the compressor because a compression ratio of a refrigerant is increased compared to a case where cooling is performed due to a low outside temperature.

If the electromotive compressor is unexpectedly cut off when cooling is performed or when heating is performed as described above, a passenger in a vehicle may feel uncomfortable because the electromotive compressor does not perform cooling and heating inside the vehicle. Furthermore, there is a problem in that noise and vibration are generated due to repeated restarts.

SUMMARY OF THE INVENTION

An embodiment of the present invention is to provide a method for controlling an electromotive compressor in a heat pump system for a vehicle, which is capable of preventing the unexpected cutoff of a compressor by controlling the number of rotations of the compressor based on the discharge pressure of the compressor.

In accordance with an embodiment of the present invention, a method for controlling an electromotive compressor in a heat pump system for a vehicle includes a temperature detection step of detecting a target temperature $T_{target}$ and a room temperature T; a rotational frequency calculation step of calculating the number of rotations of a compressor based on the target temperature $T_{target}$ and the room temperature T detected at the temperature detection step; a discharge pressure detection step of detecting a discharge pressure $P_d$ of the compressor; and a rotational frequency control step of decreasing the number of rotations of the compressor if the detected discharge pressure $P_d$ is a predetermined maximum heating upper-limit discharge pressure $P_{d\_h\_max}$ or higher and increasing the number of rotations of the compressor if the detected discharge pressure $P_d$ is a predetermined maximum heating lower-limit discharge pressure $P_{d\_h\_min}$ or lower in a heating operation. The discharge pressure detection step is performed again after the rotational frequency control step, wherein the number of rotations of the compressor is increased at a slew rate higher than a previous slew rate in the rotational frequency control step if the discharge pressure $P_d$ is the maximum heating lower-limit discharge pressure $P_{d\_h\_min}$ or lower and the room temperature T is lower than the target temperature $T\_{target}$ even after a lapse of a specific time since the number of rotations is controlled.

A PTC heater is driven if the discharge pressure $P_d$ is the maximum heating upper-limit discharge pressure $P_{d\_h\_max}$ or higher and the room temperature T is lower than the target temperature $T\_{target}$ after the number of rotations of the compressor is reduced in the rotational frequency control step.

The operation of the compressor is cut off if the number of rotations of the compressor is a predetermined minimum number of rotations $rpm\_{min}$ or lower after the rotational frequency control step is performed.

The operation of the compressor is cut off if the discharge pressure $P_d$ is a predetermined limit heating discharge pressure $P_{d\_L}$ or higher in the rotational frequency control step.

In accordance with another embodiment of the present invention, a method for controlling an electromotive compressor in a heat pump system for a vehicle includes a temperature detection step of detecting a target temperature $T\_{target}$ and a room temperature T; a rotational frequency calculation step of calculating the number of rotations of a compressor based on the target temperature $T\_{target}$ and the room temperature T detected at the temperature detection step; a discharge pressure detection step of detecting a discharge pressure $P_d$ of the compressor; and a rotational frequency control step of decreasing the number of rotations of the compressor if the detected discharge pressure $P_d$ is a predetermined maximum cooling upper-limit discharge pressure $P_{d\_c\_min}$ or higher and increasing the number of rotations of the compressor if the detected discharge pressure $P_d$ is a predetermined maximum cooling lower-limit discharge pressure $P_{d\_c\_min}$ or lower in a cooling operation. The discharge pressure detection step is performed again after the rotational frequency control step. The number of rotations of the compressor 300 is increased at a slew rate higher than a previous slew rate in the rotational frequency control step if the discharge pressure $P_d$ is the maximum cooling lower-limit discharge pressure $P_{d\_c\_min}$ or lower and the room temperature T is higher than the target temperature $T\_{target}$ even after a lapse of a specific time since the number of rotations is controlled.

The number of rotations of the compressor is decreased at a predetermined slew rate in the rotational frequency control step.

The operation of the compressor is cut off if the number of rotations of the compressor is a predetermined minimum number of rotations $rpm\_{min}$ or lower after the rotational frequency control step is performed.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EXEMPLARY EMBODIMENTS OF THE INVENTION

A "compressor" described hereinafter is an electromotive compressor that forms a heat pump system for a vehicle. The compressor may freely operate regardless of the driving frequency of rotation (rpm) of a vehicle because it generates driving force using electricity.

Figure 1:
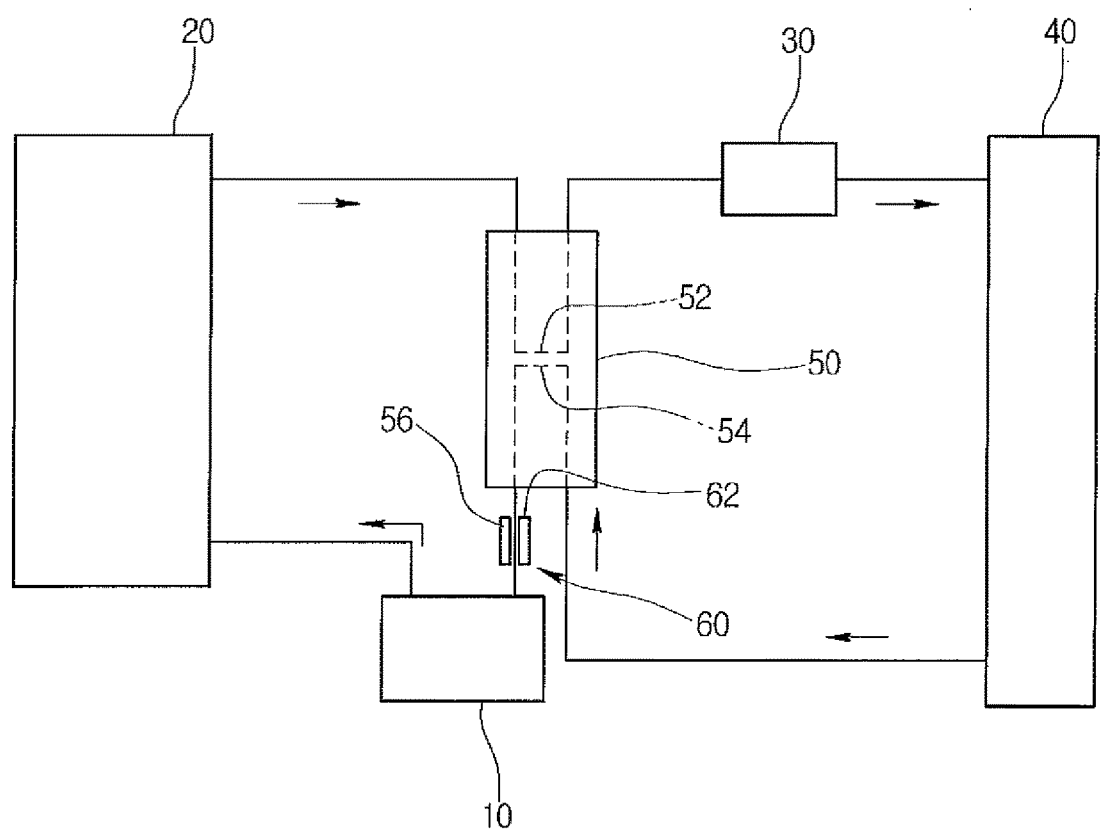
FIG. 1 is a configuration illustrating a conventional heat pump system for a vehicle.
Figure 2:
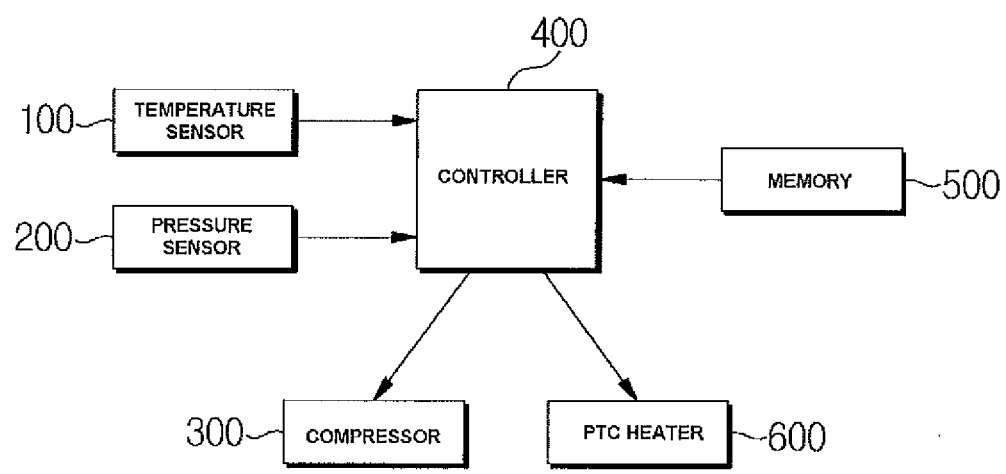
FIG. 2 is a schematic diagram illustrating a system for controlling a compressor in accordance with an embodiment of the present invention.

FIG. 2 is a schematic diagram illustrating a system for controlling a compressor in accordance with an embodiment of the present invention. In accordance with an embodiment of the present invention, the value of a room temperature T within a vehicle that is detected by a temperature sensor 100 and the value of a discharge pressure $P_d$ of a compressor 300 that is detected by a pressure sensor 200 are transmitted to a controller 400.

The controller 400 sets the number of rotations of the compressor 300 based on a target temperature $T\_{target}$ and a current room temperature T that are basically set by a driver. The controller 400 controls the discharge pressure $P_d$ of a refrigerant externally discharged by the compressor 300 so that the discharge pressure $P_d$ maintains a specific range by controlling the number of rotations of the compressor 300 based on the discharge pressure $P_d$ of the compressor 300 detected by the pressure sensor 200, thereby preventing the unexpected cutoff of the compressor 300.

A method for controlling the number of rotations of the compressor 300 when the heat pump system performs a heating operation (in heat pump mode) and a cooling operation (in air-conditioning mode) is described below step by step with reference to FIGS. 3 and 4.

Figure 4:
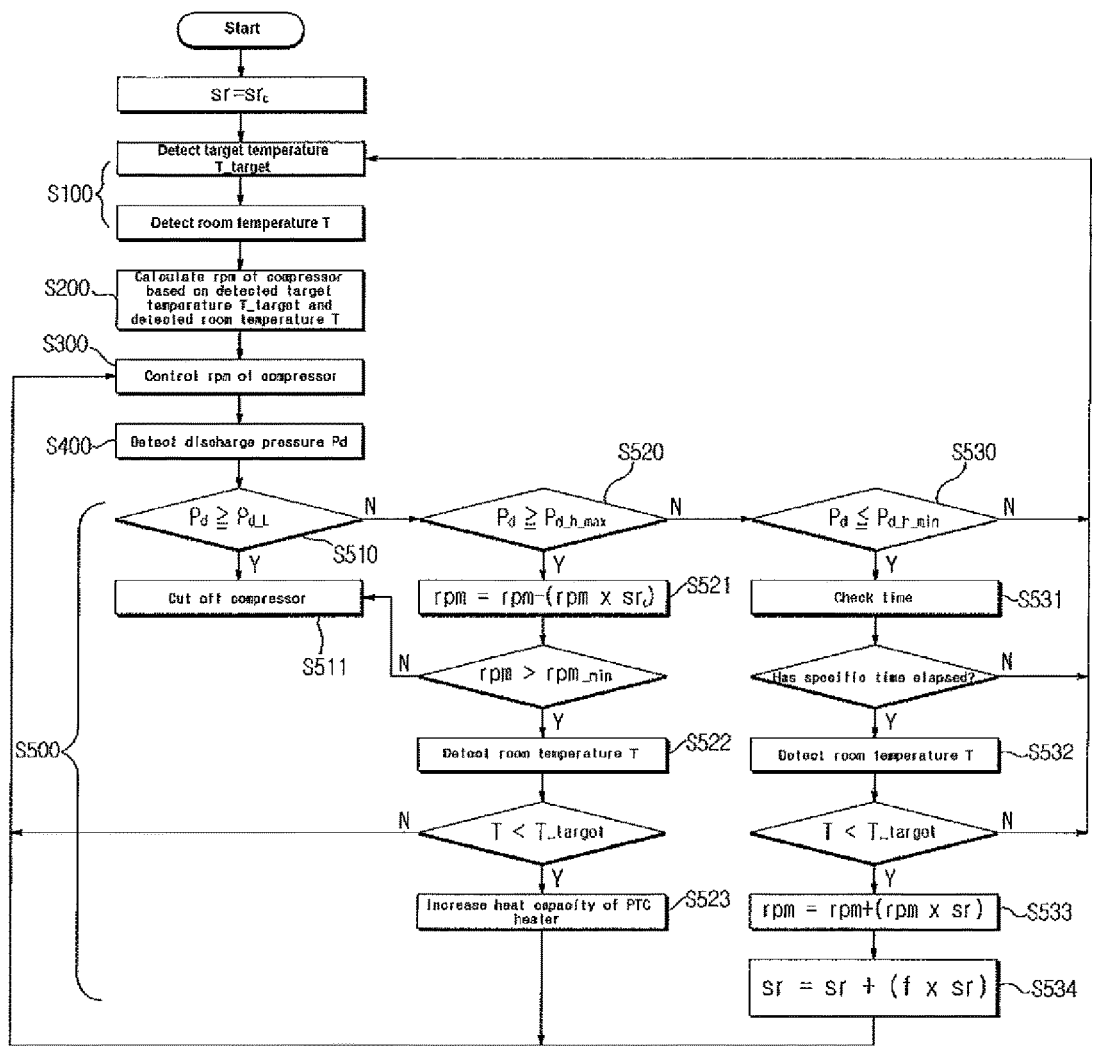
FIG. 4 is a flowchart illustrating a method for controlling a compressor when heating is performed in accordance with an embodiment of the present invention.

FIG. 4 is a flowchart illustrating a method for controlling a compressor when heating is performed in accordance with an embodiment of the present invention.

Referring to FIG. 4, when the heating operation of a heat pump system is started, first, a target temperature $T\_{target}$ and a current room temperature T set by a driver are detected by the temperature sensor 100 at step S100 and are transmitted to the controller 400 on one side of the compressor 300.

The controller 400 calculates the number of rotations (rpm) of the compressor 300 based on the detected target temperature $T\_{target}$ and the detected room temperature T at step S200, sets the number of rotations of the compressor 300 based on the calculated value at step S300, and then control the operation of the compressor 300.

Furthermore, the discharge pressure $P_d$ of a refrigerant compressed and discharged by the compressor 300 is detected by the pressure sensor 200 at step S400 and is then transmitted to the controller 400.

The controller 400 controls the number of rotations of the compressor 300 based on the detected discharge pressure $P_d$ of the compressor 300 at step S500. If the detected discharge pressure $P_d$ is a limit heating discharge pressure $P_{d\_L}$ or higher, the controller 400 cuts off the operation of the compressor 300. Furthermore, if the detected discharge pressure $P_d$ is a maximum heating upper-limit discharge pressure $P_{d\_h\_max}$ or higher, the controller 400 controls the number of rotations so that it is decreased. If the detected discharge pressure $P_d$ is a maximum heating lower-limit discharge pressure $P_{d\_h\_min}$ or lower, the controller 400 controls the number of rotations so that it is increased. That is, the controller 400 controls the number of rotations of the compressor 300 so that the discharge pressure $P_d$ of the compressor 300 remains between the maximum heating lower-limit discharge pressure $P_{d\_h\_min}$ and the maximum heating upper-limit discharge pressure $P_{d\_h\_max}$.

In this case, an increase in the number of rotations of the compressor 300 is performed when the discharge pressure $P_d$ is still the maximum heating lower-limit discharge pressure $P_{d\_h\_min}$ or lower and the room temperature T is lower than the target temperature $T_{\_target}$ even after a lapse of a specific time.

In this case, the values of the limit heating discharge pressure $P_{d\_L}$, the maximum heating upper-limit discharge pressure $P_{d\_h\_max}$, and the maximum heating lower-limit discharge pressure $P_{d\_h\_min}$ may be previously set. For example, the limit heating discharge pressure $P_{d\_L}$ of 21 kgf/cm$^2$, the maximum heating upper-limit discharge pressure $P_{d\_h\_max}$ of 18 kg/cm$^2$, and the maximum heating lower-limit discharge pressure $P_{d\_h\_min}$ of 17 kgf/cm$^2$ may have been previously stored in a memory 500 in the form of data. The controller 400 compares the discharge pressure $P_d$ with data stored in the memory 500.

If the number of rotations of the compressor 300 is to be decreased, the controller 400 controls the number of rotations of the compressor 300 so that it is decreased at a slew rate "sr$_0$" previously set in memory 500. If the number of rotations of the compressor 300 is to be increased, the controller 400 increases an existing slew rate "sr" at a specific ratio "f" and controls the number of rotations of the compressor 300 so that it is increased.

In FIG. 4, the controller 400 compares the discharge pressure $P_d$ with the limit heating discharge pressure $P_{d\_L}$ at step S510. If, as a result of the comparison, the detected discharge pressure $P_d$ is found to be the limit heating discharge pressure $P_{d\_L}$ or higher, the controller 400 cuts off the operation of the compressor 300 at step S511.

For example, if the detected discharge pressure $P_d$ is lower than the limit heating discharge pressure $P_{d\_L}$, the controller 400 compares the detected discharged pressure $P_d$ with the maximum heating upper-limit discharge pressure $P_{d\_h\_max}$ at step S520. If, as a result of the comparison, the detected discharge pressure $P_d$ is found to be lower than the limit heating discharge pressure $P_{d\_L}$ and to be the maximum heating upper-limit discharge pressure $P_{d\_h\_max}$ or higher, the controller 400 decreases the number of rotations of the compressor 300 at the predetermined slew rate "sr$_0$" (e.g., 50 rpm/s) at step S521.

In this case, if the decreased number of rotations (rpm) of the compressor 300 is a predetermined minimum number of rotations rpm$_{\_min}$ (e.g., 2000 rpm) or less, the controller 400 cuts off the operation of the compressor 300 in order to prevent a failure at step S511. Furthermore, if the number of rotations of the compressor 300 reduced through the step of controlling the number of rotations is greater than the predetermined minimum number of rotations rpm$_{\_min}$, the controller 400 detects a current room temperature T through the temperature sensor 100 at step S522.

If the detected room temperature T is the target temperature $T_{\_target}$ or higher, the controller 400 returns to the step S300 of setting the number of rotations of the compressor 300 and drives the compressor 300 based on the decreased number of rotations.

In contrast, if the detected room temperature T is lower than the target temperature $T_{\_target}$, the controller 400 increases the heat capacity of a PTC heater 600 at step S523. In this case, when the PTC heater 600 is in an OFF state, the controller 400 switches the PTC heater 600 from the OFF state to an ON state. The heat capacity of the PTC heater 600 may be controlled by the amount of electric energy supplied, such as a supplied power source. An increment in the heat capacity of the PTC heater 600 may be properly selected, if necessary.

If, as a result of the comparison at step S520, the detected discharge pressure $P_d$ is found to be smaller than the maximum heating upper-limit discharge pressure $P_{d\_h\_max}$, the controller 400 compares the discharge pressure $P_d$ with the maximum heating lower-limit discharge pressure $P_{d\_h\_max}$ at step S530. If, as a result of the comparison, the detected discharge pressure $P_d$ is found to be lower than the maximum heating upper-limit discharge pressure $P_{d\_h\_max}$ and to be higher than the maximum heating lower-limit discharge pressure $P_{d\_h\_min}$, the controller 400 returns to the step S100 of detecting a temperature and drives and controls the compressor 300 based on the number of rotations calculated based on the room temperature T and the target temperature $T_{\_target}$.

If, as a result of the comparison at step S530, the detected discharge pressure $P_d$ is found to be the maximum heating lower-limit discharge pressure $P_{d\_h\_min}$ or lower, the controller 400 checks time at step S531. If the checked time for which the maximum heating lower-limit discharge pressure $P_{d\_h\_min}$ or lower is maintained does not exceed a specific time, the controller 400 returns to the step S100 of detecting a temperature. In this case, the criterion for time for which the maximum cooling lower-limit discharge pressure $P_{d\_h\_min}$ or lower is maintained may be properly selected, if necessary.

If the checked time for which the maximum heating lower-limit discharge pressure $P_{d\_h\_min}$ or lower is maintained exceeds the specific time, the controller 400 detects a current room temperature T at step S532. In this case, if the detected room temperature T is found to be the target temperature $T_{\_target}$ or higher, the controller 400 detects a room temperature again at step S100. If the detected room temperature T is lower than the target temperature $T_{\_target}$, the controller 400 increases the number of rotations of the compressor 300 at the slew rate "sr" at step S533.

In this case, the increased number of rotations of the compressor 300 is obtained by adding the existing number of rotations to a value obtained by multiplying the existing number of rotations by the slew rate "sr". When the number of rotations of the compressor 300 is first increased, the predetermined slew rate "sr$_0$" is applied to the number of rotations of the compressor 300. Thereafter, if the number of rotations of the compressor 300 is to be continuously increased, the previous slew rate "sr" is increased at the specific ratio "f" and applied to the number of rotations at step S534. For example, if the slew rate "sr" is to be increased 50%, when a slew rate applied in a first step is 50 rpm/s, a slew rate in a second step is 75 rpm/s and a slew rate in a third step is 87.5 rpm/s.

Figure 3:
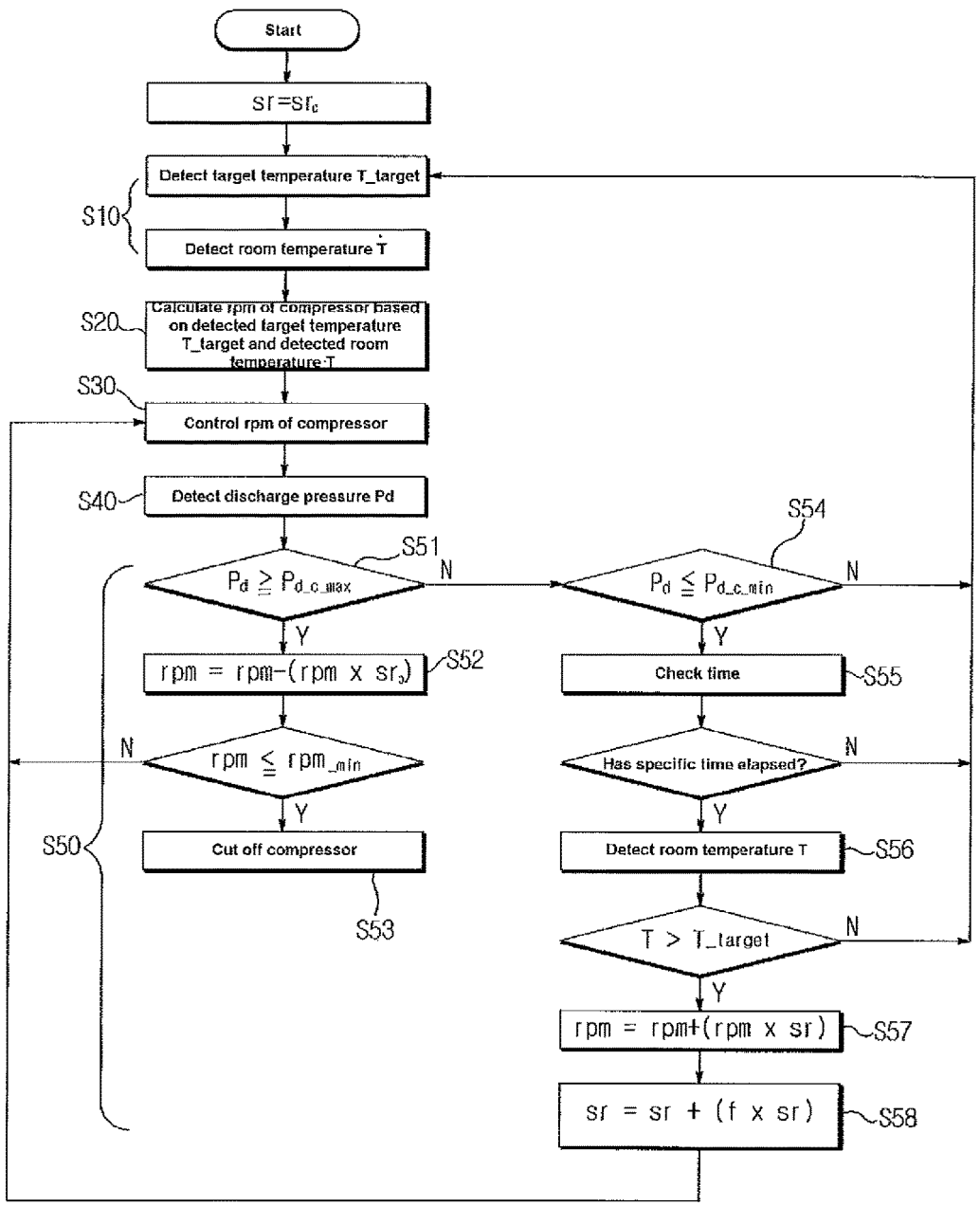
FIG. 3 is a flowchart illustrating a method for controlling a compressor when cooling is performed in accordance with an embodiment of the present invention.

FIG. 3 is a flowchart illustrating a method for controlling a compressor when cooling is performed in accordance with an embodiment of the present invention.

When the cooling operation of a heat pump system is started, first, a target temperature $T_{\_target}$ and a current room temperature T set by a driver are detected by the temperature sensor 100 and are transmitted to the controller 400 on one side of the compressor 300 at step S10.

The controller 400 calculates the number of rotations (rpm) of the compressor 300 based on the detected target temperature $T\_{target}$ and the detected room temperature T at step S20, sets the number of rotations of the compressor 300 based on the calculated value at step S30, and controls the operation of the compressor 300.

Furthermore, the discharge pressure $P_d$ of a refrigerant discharged by the compressor 300 is detected by the pressure sensor 200 at step S40 and is transmitted to the controller 400.

The controller 400 controls the number of rotations of the compressor 300 based on the detected discharge pressure $P_d$ of the compressor 300 at step S50. If the detected discharge pressure $P_d$ is a maximum cooling upper-limit discharge pressure $P_{d\_c\_max}$ or higher, the controller 400 controls the number of rotations of the compressor 300 so that it is decreased. If the detected discharge pressure $P_d$ is a maximum cooling lower-limit discharge pressure $P_{d\_c\_min}$ or lower, the controller 400 controls the number of rotations of the compressor 300 so that it is increased.

That is, the controller 400 controls the number of rotations of the compressor 300 so that the discharge pressure $P_d$ of the compressor 300 remains between the maximum cooling lower-limit discharge pressure $P_{d\_c\_min}$ and the maximum cooling upper-limit discharge pressure $P_{d\_c\_max}$.

In this case, an increase in the number of rotations of the compressor 300 is performed when the discharge pressure $P_d$ is still the maximum cooling lower-limit discharge pressure $P_{d\_c\_min}$ or lower and the room temperature T is higher than the target temperature $T\_{target}$ even after a lapse of a specific time.

In this case, the values of the maximum cooling upper-limit discharge pressure $P_{d\_c\_max}$ and the maximum cooling lower-limit discharge pressure $P_{d\_c\_min}$ may be previously set. For example, the maximum cooling upper-limit discharge pressure $P_{d\_c\_max}$ of 31 kgf/cm$^2$ and the maximum cooling lower-limit discharge pressure $P_{d\_c\_min}$ of 28 kgf/cm$^2$ may be previously stored in the memory 500. The controller 400 may read the stored values from the memory 500 and compare each of the values with the discharge pressure $P_d$.

In accordance with an embodiment of the present invention, if the number of rotations of the compressor 300 is to be decreased, the controller 400 controls the number of rotations of the compressor 300 so that it is decreased at a slew rate "$sr_0$" previously set in the memory 500. If the number of rotations of the compressor 300 is to be increased, the controller 400 increases an existing slew rate "sr" at a specific ratio "f" and controls the number of rotations of the compressor 300 so that it is increased.

Referring back to FIG. 3, the controller 400 compares the detected discharge pressure $P_d$ with the maximum cooling upper-limit discharge pressure $P_{d\_c\_max}$ at step S51. If, as a result of the comparison, the detected discharge pressure $P_d$ is found to be the maximum cooling upper-limit discharge pressure $P_{d\_c\_max}$ or higher, the controller 400 decreases the number of rotations of the compressor 300 at a predetermined slew rate (e.g., 50 rpm/s) at step S52.

In this case, if the reduced number of rotations of the compressor 300 is a minimum number of rotations rpm_$min$ (e.g., 2000 rpm) or lower previously set in the memory 500, the controller 400 cuts off the operation of the compressor 300 in order to prevent a failure at step S53. If the number of rotations of the compressor 300 reduced through the step S50 of controlling the number of rotations is greater than the predetermined minimum number of rotations rpm_$min$, the controller 400 returns to the step S30 of setting the number of rotations of the compressor 300 and drives the compressor 300 based on the decreased number of rotations.

If, as a result of the comparison at step S51, the detected discharge pressure $P_d$ is found to be lower than the maximum cooling upper-limit discharge pressure $P_{d\_c\_max}$, the controller 400 compares the detected discharge pressure $P_d$ with the maximum cooling lower-limit discharge pressure $P_{d\_c\_min}$ at step S54.

If the detected discharge pressure $P_d$ is lower than the maximum cooling upper-limit discharge pressure $P_{d\_c\_max}$ and is higher than the maximum cooling lower-limit discharge pressure $P_{d\_c\_min}$, the controller 400 receives a current room temperature T detected by the temperature sensor 100 again at step S10 and drives the compressor 300 based on the number of rotations calculated based on the room temperature T and the target temperature $T\_{target}$.

In contrast, if, as a result of the comparison at step S54, the detected discharge pressure $P_d$ is found to be the maximum cooling lower-limit discharge pressure $P_{d\_c\_min}$ or lower, the controller 400 checks a time at step S55. If the checked time for which the maximum cooling lower-limit discharge pressure $P_{d\_c\_min}$ or lower is maintained does not exceed the specific time, the controller 400 returns to the step S10 of detecting a temperature. In this case, the criterion for time for which the maximum cooling lower-limit discharge pressure $P_{d\_c\_min}$ or lower is maintained may be properly selected, if necessary.

In contrast, if the checked time for which the maximum cooling lower-limit discharge pressure $P_{d\_c\_min}$ or lower is maintained exceeds the specific time, the controller 400 detects a current room temperature T at step S56. In this case, if the detected room temperature T is the target temperature $T\_{target}$ or lower, the controller 400 receives a current room temperature T detected by the temperature sensor 100 again at step S10. If the detected room temperature T is higher than the target temperature $T\_{target}$, the controller 400 increases the number of rotations of the compressor 300 at the slew rate "sr" at step S57.

Accordingly, the increased number of rotations of the compressor 300 is obtained by adding the existing number of rotations to a value obtained by multiplying the existing number of rotations by the slew rate "sr". When the number of rotations of the compressor 300 is first increased, the predetermined slew rate "$sr_0$" is applied to the number of rotations of the compressor 300. Thereafter, if the number of rotations of the compressor 300 is to be continuously increased, the previous slew rate "sr" is increased at the specific ratio "f" and applied to the number of rotations at step S58. For example, if the slew rate "sr" is to be increased 50%, when a slew rate applied in a first step is 50 rpm/s, a slew rate in a second step is 75 rpm/s and a slew rate in a third step is 87.5 rpm/s.

As described above, in accordance with the method for controlling an electromotive compressor in a heat pump system for a vehicle according to an embodiment of the present invention, when a heat pump system for a vehicle performs a cooling or heating operation, the number of rotations (rpm) of the compressor 300 is controlled within a specific range based on the discharge pressure $P_d$ of the compressor 300. Accordingly, an unexpected cutoff of the compressor 300 attributable to overload can be prevented and the generation of noise and vibration attributable to frequent restarts can be prevented, thereby being capable of improving sensitive quality. Furthermore, there is an advantage in that the durability and stability of a heat pump system for a vehicle including the compressor 300 can be improved.

Furthermore, the discharge pressure of the compressor 300 remains in a specific range because the number of rotations of the compressor 300 is controlled based on the discharge pressure $P_d$ of the compressor 300 when cooling or heating is performed.

Furthermore, a regular room temperature T can be maintained because an unexpected cutoff of the compressor 300 attributable to overload is prevented, and the sensitive quality of a vehicle can be improved because noise and vibration attributable to compressor 300 restarts are prevented.

What is claimed is:

1. A method for controlling an electromotive compressor in a heat pump system for a vehicle, comprising:
    providing a controller in communication with a temperature sensor, a pressure sensor, a memory, and the electromotive compressor;
    receiving a predetermined target temperature selected by a user of the vehicle and a room temperature detected by the temperature sensor by the controller;
    calculating a number of rotations of the electromotive compressor based on the predetermined target temperature and the room temperature by the controller;
    receiving a discharge pressure of the electromotive compressor detected by the pressure sensor by the controller;
    decreasing the number of rotations of the electromotive compressor by the controller if the discharge pressure is one of equal to and greater than a predetermined maximum heating upper-limit discharge pressure in a heating operation of the heat pump system; and
    increasing the number of rotations of the electromotive compressor by the controller if the discharge pressure is one of equal to and less than a predetermined maximum heating lower-limit discharge pressure in the heating operation of the heat pump system, wherein the number of rotations of the electromotive compressor is increased by a slew rate if the discharge pressure is one of equal to and less than the maximum heating lower-limit discharge pressure and the room temperature is less than the predetermined target temperature after a lapse of a specific time, wherein the slew rate is increased by a specific ratio if the number of rotations of the electromotive compressor is increased.

2. The method according to claim 1, wherein the controller controls the number of rotations of the electromotive compressor to maintain the discharge pressure of the electromotive compressor between the predetermined maximum heating lower-limit discharge pressure and the predetermined maximum heating upper-limit discharge pressure.

3. A method for controlling an electromotive compressor in a heat pump system for a vehicle, comprising:
    providing a controller in communication with a temperature sensor, a pressure sensor, a memory, and the electromotive compressor;
    receiving a predetermined target temperature selected by a user of the vehicle and a room temperature detected by the temperature sensor by the controller;
    calculating a number of rotations of the electromotive compressor based on the predetermined target temperature and the room temperature by the controller;
    receiving a discharge pressure of the electromotive compressor detected by the pressure sensor by the controller;
    decreasing the number of rotations of the electromotive compressor by the controller if the discharge pressure is one of equal to and greater than a predetermined maximum heating upper-limit discharge pressure in a heating operation of the heat pump system;
    increasing the number of rotations of the electromotive compressor by the controller if the discharge pressure is one of equal to and less than a predetermined maximum heating lower-limit discharge pressure in the heating operation of the heat pump system, wherein the number of rotations of the electromotive compressor is increased by a slew rate if the discharge pressure is one of equal to and less than the maximum heating lower-limit discharge pressure and the room temperature is less than the predetermined target temperature after a lapse of a specific time;
    providing a positive temperature coefficient heater in communication with the controller; and
    controlling the positive temperature coefficient heater by the controller if the discharge pressure is one of equal to and greater than the maximum heating upper-limit discharge pressure and the room temperature is lower than the predetermined target temperature after the number of rotations of the electromotive compressor is decreased.

4. A method for controlling an electromotive compressor in a heat pump system for a vehicle, comprising:
    providing a controller in communication with a temperature sensor, a pressure sensor, a memory, and the electromotive compressor;
    receiving a predetermined target temperature selected by a user of the vehicle and a room temperature detected by the temperature sensor by the controller;
    calculating a number of rotations of the electromotive compressor based on the predetermined target temperature and the room temperature by the controller;
    receiving a discharge pressure of the electromotive compressor detected by the pressure sensor by the controller;
    decreasing the number of rotations of the electromotive compressor by the controller if the discharge pressure is one of equal to and greater than a predetermined maximum heating upper-limit discharge pressure in a heating operation of the heat pump system;
    increasing the number of rotations of the electromotive compressor by the controller if the discharge pressure is one of equal to and less than a predetermined maximum heating lower-limit discharge pressure in the heating operation of the heat pump system, wherein the number of rotations of the electromotive compressor is increased by a slew rate if the discharge pressure is one of equal to and less than the maximum heating lower-limit discharge pressure and the room temperature is less than the predetermined target temperature after a lapse of a specific time; and
    stopping an operation of the electromotive compressor by the controller if the number of rotations of the electromotive compressor is one of equal to and less than a predetermined minimum number of rotations after the number of rotations of the electromotive compressor is decreased.

5. The method according to claim 1, further comprising the step of stopping an operation of the electromotive compressor by the controller if the discharge pressure is one of equal to and greater than a predetermined limit heating discharge pressure.

6. The method according to claim 5, wherein the predetermined limit heating discharge pressure is 21 kgf/cm$^3$.

7. The method according to claim 1, wherein the predetermined maximum heating upper-limit discharge pressure is 18 kgf/cm$^3$.

8. The method according to claim 1, wherein the predetermined maximum heating lower-limit discharge pressure is 17 kgf/cm$^3$.

9. A method for controlling an electromotive compressor in a heat pump system for a vehicle, comprising:
- providing a controller in communication with a temperature sensor, a pressure sensor, a memory, and the electromotive compressor;
- receiving a predetermined target temperature selected by a user of the vehicle and a room temperature detected by the temperature sensor by the controller;
- calculating a number of rotations of the electromotive compressor based on the predetermined target temperature and the room temperature by the controller;
- receiving a discharge pressure of the electromotive compressor detected by the pressure sensor by the controller;
- decreasing the number of rotations of the electromotive compressor by the controller if the discharge pressure is one of equal to and greater than a predetermined maximum cooling upper-limit discharge pressure in a cooling operation of the heat pump system;
- increasing the number of rotations of the electromotive compressor by the controller if the discharge pressure is one of equal to and less than a predetermined maximum cooling lower-limit discharge pressure in the cooling operation of the heat pump system, wherein the number of rotations of the electromotive compressor is increased by a slew rate if the discharge pressure is one of equal to and less than the maximum cooling lower-limit discharge pressure and the room temperature is greater than the predetermined target temperature after a lapse of a specific time; and
- stopping an operation of the electromotive compressor by the controller if the number of rotations of the electromotive compressor is one of equal to and less than a predetermined minimum number of rotations after the number of rotations of the electromotive compressor is decreased.

10. The method according to claim 9, wherein the number of rotations of the electromotive compressor is decreased by a predetermined slew rate.

11. The method according to claim 9, wherein the predetermined maximum cooling lower-limit discharge pressure is 28 kgf/cm$^3$.

12. The method according to claim 9, wherein the predetermined maximum cooling upper-limit discharge pressure is 31 kgf/cm$^3$.

13. A method for controlling an electromotive compressor in a heat pump system for a vehicle, comprising:
- providing a controller in communication with a temperature sensor, a pressure sensor, a memory, and the electromotive compressor;
- operating the heat pump system in one of a cooling operation and a heating operation;
- receiving a predetermined target temperature selected by a user of the vehicle and a room temperature detected by the temperature sensor by the controller;
- calculating a number of rotations of the electromotive compressor based on the predetermined target temperature and the room temperature by the controller;
- receiving a discharge pressure of the electromotive compressor detected by the pressure sensor by the controller;
- decreasing the number of rotations of the electromotive compressor by the controller if the discharge pressure is one of equal to and greater than a predetermined maximum heating upper-limit discharge pressure in a heating operation of the heat pump system;
- increasing the number of rotations of the electromotive compressor by the controller if the discharge pressure is one of equal to and less than a predetermined maximum heating lower-limit discharge pressure in the heating operation of the heat pump system;
- decreasing the number of rotations of the electromotive compressor by the controller if the discharge pressure is one of equal to and greater than a predetermined maximum cooling upper-limit discharge pressure in a cooling operation of the heat pump system;
- increasing the number of rotations of the electromotive compressor by the controller if the discharge pressure is one of equal to and less than a predetermined maximum cooling lower-limit discharge pressure in the cooling operation of the heat pump system;
- stopping an operation of the electromotive compressor by the controller if the number of rotations of the electromotive compressor is one of equal to and less than a predetermined minimum number of rotations after the number of rotations of the electromotive compressor is decreased during the heating operation of the heat pump system; and
- stopping the operation of the electromotive compressor by the controller if the number of rotations of the electromotive compressor is one of equal to and less than a predetermined minimum number of rotations after the number of rotations of the electromotive compressor is decreased during the cooling operation of the heat pump system.

14. The method according to claim 13, further comprising the step of controlling a positive thermal coefficient heater by the controller if the discharge pressure is one of equal to and greater than the maximum heating upper-limit discharge pressure and the room temperature is lower than the predetermined target temperature after the number of rotations of the electromotive compressor is decreased during the heating operation of the heat pump system.

15. The method according to claim 13, wherein the number of rotations of the electromotive compressor is increased by a slew rate if the discharge pressure is one of equal to and less than the maximum heating lower-limit discharge pressure and the room temperature is less than the predetermined target temperature after a lapse of a specific time, and wherein the number of rotations of the electromotive compressor is increased by a slew rate if the discharge pressure is one of equal to and less than the maximum cooling lower-limit discharge pressure and the room temperature is greater than the predetermined target temperature after a lapse of a specific time.

16. The method according to claim 13, further comprising the step of stopping the operation of the electromotive compressor by the controller if the discharge pressure is one of equal to and greater than a predetermined limit heating discharge pressure during the heating operation of the heat pump system.

17. The method according to claim 13, wherein the controller controls the number of rotations of the electromotive compressor to one of maintain the discharge pressure of the electromotive compressor between the predetermined maximum heating lower-limit discharge pressure and the predetermined maximum heating upper-limit discharge pressure during the heating operation of the heat pump system and maintain the discharge pressure of the electromotive compressor between the predetermined maximum cooling lower-limit discharge pressure and the predetermined maximum cooling upper-limit discharge pressure during the cooling operation of the heat pump system.

* * * * *